Feb. 2, 1937. C. R. PATON 2,069,420
MOTOR VEHICLE
Filed Jan. 2, 1934 2 Sheets-Sheet 1

Inventor
Clyde R. Paton
By Watson, Coit, Morse & Grindle
Attorney

Feb. 2, 1937.  C. R. PATON  2,069,420
MOTOR VEHICLE
Filed Jan. 2, 1934  2 Sheets-Sheet 2
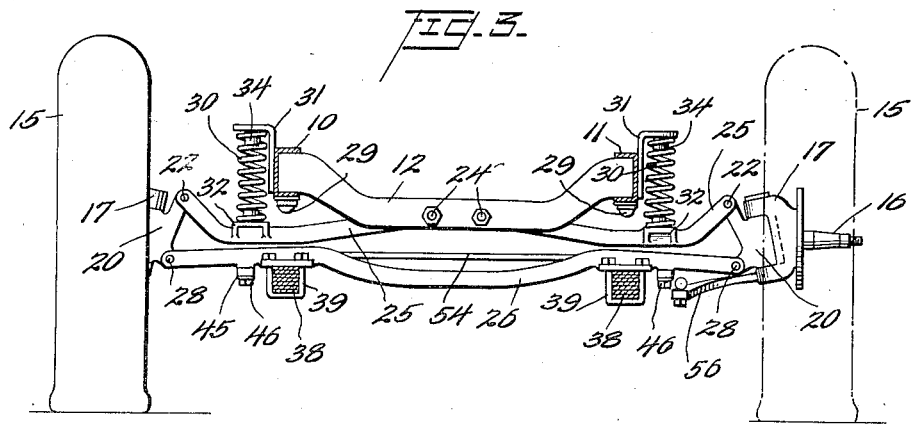
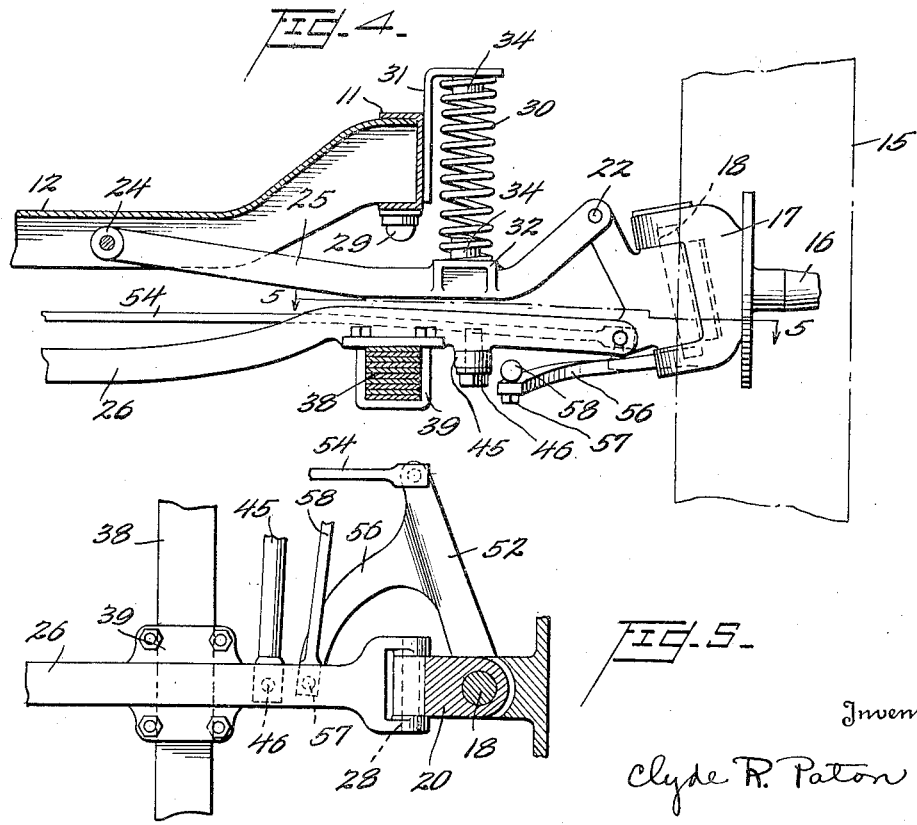
Inventor
Clyde R. Paton
By Watson, Cait, Horse & Grindle
Attorney Patented Feb. 2, 1937

2,069,420

UNITED STATES PATENT OFFICE 2,069,420

MOTOR VEHICLE

Clyde R. Paton, Birmingham, Mich., assignor to Packard Motor Car Company, Detroit, Mich., a corporation of Michigan Application January 2, 1934, Serial No. 704,959

4 Claims. (Cl. 280—124)

This invention relates to improvements in motor vehicles and more particularly to vehicle wheel suspensions in which the wheels are supported for independent rising and falling movement with respect to the vehicle frame.

It is the principal object of the invention to provide a wheel suspension which is simple and sturdy in construction and which is readily adaptable to different types of vehicles so as to afford the maximum improvement in riding quality under varying road conditions. It is a feature of the invention that the frequency of the elastic suspension system for the vehicle can be varied over a wide range to suit conditions of use and may be reduced to a low value without impairing the lateral stability of the vehicle or the strength of the several elements of the wheel suspension.

It is a further feature of the invention that the road wheels, in rising and falling with respect to the vehicle frame, are constrained to move in such manner as to minimize wear of the tires and, in the application of the suspension to steerable road wheels, to facilitate steering control of the vehicle.

Further objects and features of the invention will be apparent from the following description taken in connection with the accompanying drawings, in which Figure 1 is a plan view of a portion of a vehicle chassis illustrating one form of the invention;

Figure 3 is a front elevation of the arrangement shown in Figure 1 with certain parts in section;

Figure 4 is an enlarged fragmentary view of a portion of the construction shown in Figure 3; and Figure 5 is a section taken substantially on the line 5—5 of Figure 4.

Figure 1:
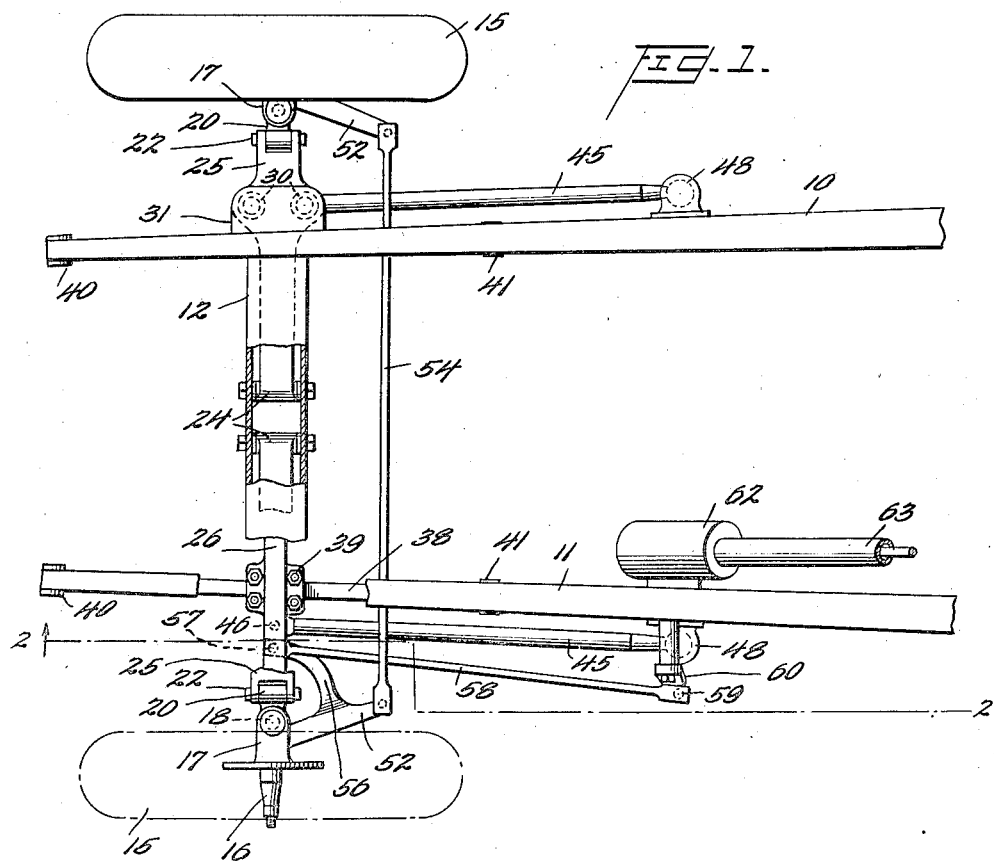
Figure 2:
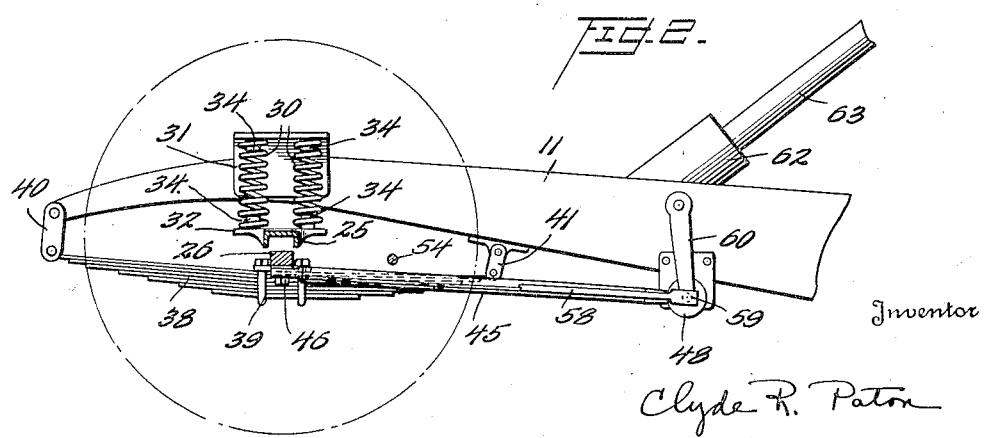
Figure 2 is a vertical section taken substantially on the line 2—2 of Figure 1.

In describing the invention, reference will be made to the drawings in which the invention has been illustrated as applied to the front steerable road wheels of a vehicle. It will nevertheless be understood that certain features of the invention are equally applicable to the rear road wheels and to road wheels which are not steerable. It will furthermore be appreciated that while the various elements disclosed in the drawings are described hereinafter by specific language in order to facilitate an understanding of the principles of the invention, no limitation of the invention is thereby intended, various alterations of these details such as fall within the scope of the invention being contemplated as will appear from the appended claims.

The supporting frame of the vehicle is illustrated conventionally as comprising the side frame members 10 and 11 and the cross frame member 12, the latter extending between and being rigidly secured to the side frame members in the usual manner. The road wheels 15 are carried on wheel spindles 16 which are in turn rigid with steering knuckles 17, each of the steering knuckles being supported for rising and falling movement as well as for steering movement in a substantially horizontal plane, a similar construction being employed at each side of the vehicle. For convenience in describing the invention reference will therefore be made principally to the construction at one side only, similar reference characters being applied to similar oppositely disposed parts.

Thus each steering knuckle 17 may be swung for steering purposes about the axis of the usual king pin 18, the latter being carried by a wheel supporting member 20. It will be understood that the construction thus far described is conventional and that the details thereof form no essential part of the present invention but may be varied within wide limits. Thus the usual practice may be followed with respect to the inclination of the axis of the king pin in order to afford the desired wheel camber and the inclination of this axis and of the plane of the road wheel with respect to a vertical plane may be modified as desired.

Each wheel supporting member 20 is pivotally connected about a horizontal or nearly horizontal axis indicated at 22 with an upper wheel supporting link 25, the latter being pivoted to the cross frame member 12 for rising and falling movement about an axis 24. A common lower wheel supporting link 26 is provided for the road wheel assemblies 15 at opposite sides of the vehicle, this link being pivotally connected at its ends with the respective wheel carrying members 20 on axes 28 which are substantially parallel to the axes 22 and 24 of the upper links 25.

Upward movement of each of the upper wheel supporting links 25 is resisted by means of one or more coil springs 30. Thus a bracket 31 may be secured to the adjacent side frame member of the vehicle frame to afford a seat for the springs 30 and a corresponding seat 32 may be formed on the upper side of the link 25, these seats being preferably provided with spring guides 34 in the usual manner. The lower link 26 is yieldingly connected to the vehicle frame by means of longitudinally extending leaf spring assemblies 38, each spring assembly being secured as at 39 to the link 26 and being shackled in the conventional manner as indicated at 40 and 41 to the side frame member of the vehicle, it being understood that the connection between each spring and the frame is such as to permit longitudinal displacement of the spring ends as the spring is flexed.

Preferably some means are provided for limiting upward movement of the links. This means may comprise an abutment 29 secured to the side frame of the vehicle and having a facing of yielding material such as rubber positioned for engagement by the associated upper link 25. Alternatively, cooperating abutments may be formed within the coil spring 30 by so disposing the spring guides 34 that they will coact when a desired limit of movement of the links has been reached, or cooperating abutments may be disposed in any other convenient manner.

Longitudinal stresses and torsional stresses such as occur on the application of the vehicle brakes are transmitted from the wheel suspension to the frame by torque arms 45, these torque arms being disposed at opposite sides of the vehicle and being connected to the lower wheel supporting link 26 as indicated at 46 for pivotal movement with respect to the link about substantially vertical axes only. The rear end of each torque arm is provided with a ball and socket connection as indicated at 48 with the associated side frame member, this connection being preferably of the type in which a sheath of rubber is interposed between the relatively movable parts of the connection so that surface friction between these parts is eliminated, the rubber being stressed on the occurrence of swinging movement of the torque arm.

The mode of operation of the wheel suspension will be apparent from the foregoing description. As either road wheel rises or falls during operation of the vehicle, the associated links 25 and 26 will swing about their axes of pivotal connection to the vehicle frame and to the oppositely disposed wheel carrying member 20 respectively without affecting the relative position of the oppositely disposed road wheel and the vehicle frame, rising movement being resisted by the springs associated with the respective links. It will be observed that a modified form of parallel link suspension is provided by this construction, the extreme length of the suporting links serving to reduce the tread variation and the camber variation to a minimum as the wheels rise and fall from the normal position in which they are illustrated in the drawings. It will furthermore be observed that the upper links 25 are shorter than the common lower link 26. If these links were of the same length as in the conventional parallel link system, the road wheels on rising would be carried through a series of parallel positions and simultaneously displaced bodily inward toward the vehicle frame, this inward displacement of the wheel giving rise to considerable wear of the tire tread in passing over an uneven road surface. However, by reason of the fact that the upper links 25 are shorter, the upper portion of each wheel as the wheel rises will be displaced inwardly to a greater extent than the lower portion of the wheel, with the result that the plane of the wheel is tilted inwardly, and this tilting of the wheel more or less completely offsets the aforementioned bodily inward displacement of the wheel as the latter rises, with the result that the point of contact between the tread and the ground rises substantially vertically and undesired wear is accordingly avoided.

When the vehicle brakes are applied, each wheel and the supporting suspension system therefor tend to rotate in a counterclockwise direction as viewed from the side of the vehicle. This turning moment of braking torque is adequately resisted by the torque arms 45 which are so connected with the lower link 26 as to transmit this torque to the frame in the form of an upwardly directed force applied at the point of connection of each torque arm and the frame. The upwardly directed forces applied in this manner to the frame thus counteract in whole or in part the normal tendency of the vehicle to dip at the front end when the brakes are applied, and the stability of the vehicle is accordingly increased. Since the springs are shackled at opposite ends to the vehicle frame, rising and falling movement of the lower link 26 is controlled by the torque arms 45, a feature of importance in securing proper steering control as will be hereinafter explained.

The relative frequency of the elastic systems at the front and rear of a vehicle is found to be a factor of considerable importance in determining the riding qualities of the vehicle. Thus it may be stated generally that the frequency of these systems should be substantially equal in order to reduce the tendency of the vehicle to rock in a fore and aft direction. Furthermore, it is desirable to maintain these frequencies as low as possible since rapid up and down movement of the vehicle as a whole, even though the vehicle body is maintained in parallel relation with the road surface during such movement, is exceedingly disagreeable to the occupants of the vehicle. It is therefore highly desirable to provide a spring suspension which will permit of adjustment of the frequencies of the elastic suspension systems over a wide range in order that the greatest possible riding comfort may be obtained. The frequency of a coil spring which is of adequate strength to support a given load may be reduced to a much lower value than the frequency of a leaf spring which is of sufficient strength to support the same load and it is therefore obvious that by the employment of both coil and leaf springs and by proper design of both types of springs various frequencies for the entire suspension system may be established. Furthermore, the present construction makes possible the establishment of a very low spring rate by reason of the fact that the load is distributed between the springs, this being particularly important as regards the leaf spring in which the minimum frequency which can be obtained is limited principally by requirements of adequate strength.

In general it is desirable to reduce the static friction in a wheel suspension system to a minimum to avoid the transmission to the vehicle frame of the rising and falling movement of the wheels, but stability of the vehicle is sacrificed to some extent by elimination of static friction and corresponding reduction of the resistance offered by the suspension to sidesway when the vehicle rounds a curve at high speed. With the present construction a compromise is effected, the leaf spring offering sufficient resistance to sidesway to ensure adequate stability and the coil springs contributing to the easy riding qualities of the vehicle.

In the preferred form of the invention the coil springs are associated with the upper links and the leaf spring with the common lower links, but it will be appreciated that this arrangement may be reversed if desired to suit special conditions. It will also be understood that the wheel supporting links as disclosed herein may be yieldingly connected to the vehicle by means other than that shown, for instance this yielding connection may act only between the upper links and the frame or between the common lower link and the frame, or may be associated more directly with the wheel assemblies. Furthermore, it is clearly possible to employ the principle of spring disposition disclosed herein, in which the leaf and coil springs are arranged to act in parallel rather than in series, to wheel suspensions of other than the independent types, for instance to the conventional rigid axle construction.

The wheels are preferably swung for steering movement by the construction shown in the drawings although other steering mechanism may be employed if desired. Thus each steering knuckle 17 is provided with a rearwardly extending arm 52 secured rigidly to the knuckle or formed integrally therewith, the arms 52 being connected by a cross tie rod having articulated connection with each arm. It will be observed that the points of articulated connection between the rod 54 and the arms 52 are disposed adjacent to or lie substantially in the axes 28 of pivotal connection between the lower wheel supporting link 26 and the associated wheel carrying member 20. In this manner the two road wheels are connected for conjoint steering movement and yet the arrangement is such that no undesired displacement of the wheels with respect to each other occurs during rising and falling movement.

The steering knuckle 17 at the left-hand side of the vehicle is further provided with an arm 56 which has an articulated connection as at 57 with a steering drag link 58, the latter being in turn pivotally connected at 59 to the usual steering drop arm 60 which extends through the side frame member 11 and is operable by conventional gearing within a housing 62 at the lower end of the steering column 63. Since the drag link 58 lies adjacent the torque arm 45 and since the points of articulated connection of the drag link with the associated elements are located adjacent the corresponding ends of the torque arm, the axes of pivotal connection of the rear ends of the drag link and torque arm substantially coinciding, there will be no undesired displacement of the drag link as the wheels rise and fall, the forward end of the drag link describing an arc about the point of connection of the drag link and the drop arm 60 which corresponds substantially to the arc described by the inner end of the steering knuckle arm 56 as the wheels rise and fall. It will be observed that by this construction perfect steering is secured under all conditions and any tendency of the wheels to shimmy as the result of undesired displacement of the several parts of the steering mechanism is reduced to a minimum.

Having thus described the invention, what is claimed as new and desired to be secured by Letters Patent is:

1. In a motor vehicle, the combination with a vehicle frame, of road wheel assemblies disposed at opposite sides of said frame, and means supporting said wheel assemblies for independent rising and falling movement with respect to the frame, said means including a link extending transversely of the vehicle and pivoted to each wheel assembly, separate links vertically spaced from said first link, each of said last named links being pivoted to said frame and one of said wheel assemblies, torque arms acting between said frame and said means to resist braking torque, and separate springs acting between the respective links and said frame resisting upward movement of said wheel assemblies.

2. In a motor vehicle, the combination with a vehicle frame, of road wheel assemblies disposed at opposite sides of said frame, and means supporting said wheel assemblies for independent rising and falling movement with respect to the frame, said means including a link extending transversely of the vehicle and pivoted to each wheel assembly, separate links vertically spaced from said first link, each of said last named links being pivoted to said frame and one of said wheel assemblies, coil springs acting between each of said last named links and said frame to resist rising and falling movement of the wheel assembly and to transmit a substantial portion of the vehicle load thereto, and torque arms acting between said frame and said means to resist braking torque.

3. In a motor vehicle, the combination with a vehicle frame, of road wheel assemblies disposed at opposite sides of said frame, and means supporting said wheel assemblies for independent rising and falling movement with respect to the frame, said means including a link extending transversely of the vehicle and pivoted to both wheel assemblies, separate links vertically spaced from said first link, each of said last named links being pivoted to said frame and one of said wheel assemblies, torque arms acting between said frame and said first named link to resist braking torque, said torque arms extending longitudinally of the vehicle and having articulated connection with said frame, and spring means acting between said frame and each of said last named links to resist upward movement of the latter, the resistance offered by said spring means being sufficient to effect the transfer therethrough of a substantial portion of the vehicle load from the frame to the last named links.

4. In a motor vehicle, the combination with a vehicle frame, of road wheel assemblies disposed at opposite sides of said frame, and means supporting said wheel assemblies for independent rising and falling movement with respect to the frame, said means including a link extending transversely of the vehicle and pivoted to each wheel assembly, separate links vertically spaced from said first link, each of said last named links being pivoted to said frame and one of said wheel assemblies, coil springs acting between each of said last named links and said frame to resist rising and falling movement of the wheel assembly and to transmit a substantial portion of the vehicle load thereto, leaf spring means acting between said first link and said frame, and torque arms acting between said frame and said means to resist braking torque.

CLYDE R. PATON.